Figure 1:
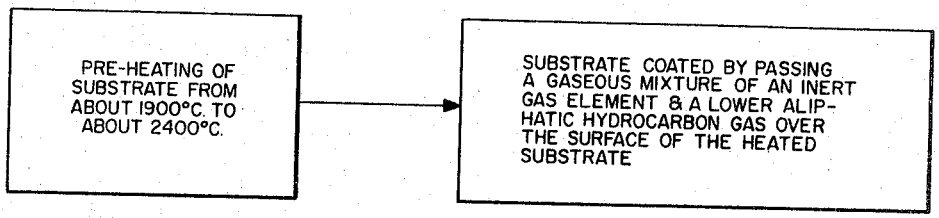

May 2, 1967     J. D. BATCHELOR     3,317,338

PYROLYTIC GRAPHITE COATING PROCESS

Filed Jan. 7, 1964

James D. Batchelor,
INVENTOR.

BY *Harry M. Saragovitz*
*Edward J. Kelly*
*Herbert Berl*
*Joseph H. Beumer*

United States Patent Office 3,317,338
Patented May 2, 1967

3,317,338
PYROLYTIC GRAPHITE COATING PROCESS
James D. Batchelor, Alexandria, Va., assignor, by mesne assignments, to the United States of America as represented by the Secretary of the Army
Filed Jan. 7, 1964, Ser. No. 336,319
17 Claims. (Cl. 117—46)

This invention relates generally to a process for depositing pyrolytic graphite coatings on suitable substrates, especially graphite substrates. More particularly, the present invention refers to a process for depositing on a commercial graphite rocket nozzle blank a heat-resistant and erosion-resistant pyrolytic graphite coating.

Present day technology has produced a need for materials capable of withstanding a very high heat flux. One particularly critical need for such materials exists in the area of rocket nozzles, especially in the throat region of the nozzles where a high heat flux is coupled with strong erosion forces. In solid propellant rocket motors, the nozzle is generally uncooled to maintain the desired simplicity of design and this situation requires nozzle materials which can withstand unusually severe temperature and erosive conditions.

In the improved solid propellants available today, it is not uncommon to encounter flame temperatures of up to 6500° F. and, in some instances, even higher. Sometimes these high flame temperatures are accompanied by oxidation ratios substantially above unity which leads to considerable quantities of such high temperature oxidizers as carbon dioxide and water in the combustion products passing through the nozzle. These oxidizers subject many nozzle materiels to severe chemical erosion.

Because of its inherent properties, graphite has often been considered as a suitable material for rocket nozzles. Graphite is very stable at high temperatures and is only moderately sensitive to oxidation. The strength of commercial graphite increases with temperature and at 4500° F. it possesses the greatest strength of any known material. Pyrolytic graphite, another form of graphite considered for rocket nozzle application, shares these desirable properties with other forms of graphite and also offers the advantage of very high purity, low porosity (high density), and highly oriented crystalline structure.

The orientation of the crystallites in pyrolytic graphite coatings is such that the layer planes in the structure lie parallel to the substrate surface on which it is deposited. Highly anisotropic thermal and mechanical properties result from this oriented structure. For example, pyrolytic graphite is an excellent heat conductor along its surface but a good insulator through its thickness. This combination of thermal properties is advantageous in rocket nozzle applications, but the anisotropic mechanical properties that exist cause serious problems. The thermal expansion coefficient of pyrolytic graphite is large through its layer planes but very low along the layer planes. Since these expansion coefficients are not matched by the commercial graphite generally used as the substrate on which the pyrolytic graphite is deposited, stresses in actual nozzle service causes fractures and subsequently nozzle failure.

It has been determined that the previous failures of pyrolytic graphite coated nozzles are a result of at least one of the following:

I. Massive fracture and delamination
II. Spalling and minor delamination
III. Chemical and mechanical erosion In massive fracture and delamination failures, the entire pyrolytic graphite coating may be lost leaving the substrate unprotected as a result of improper bonding between the coating and substrate. Spalling and minor delaminations are indicated by cracking of the pyrolytic graphite coating accompanied by the loss of small chips and slivers from the coating. This type of failure has been found to result from the pyrolytic coating being composed chiefly of a large primary cone microstructure. The third cause of failure is obviously common to all rocket nozzle materials and is the true measure of a material's capability of performing under rocket nozzle operating conditions. If the nozzle erosion is due to this third cause, a motor pressure trace would be smooth with the extent of regression being determined by the inherent stability of the material from which the nozzle is constructed.

The present invention provides a process for depositing pyrolytic graphite on a commercial graphite substrate in such a manner that failures due to causes I and II above are eliminated or controlled to such an extent that they do not interfere with the performance of the rocket nozzle. Because of the inherent excellent chemical and thermal properties of pyrolytic graphite already discussed, nozzle failures due to cause III are not a problem.

In accordance with the foregoing, it is an object of the present invention to provide a process for depositing pyrolytic graphite coatings on any suitable substrate.

A further object of the present invention is to provide a process for depositing pyrolytic graphite coatings which are capable of resisting high temperature and strong erosion forces.

A still further object of the present invention is to provide a process for producing pyrolytic graphite coated rocket nozzles which are capable of withstanding the high temperatures and erosive conditions of rocket engines.

The manner in which these as well as other objects can be accomplished will become apparent to those skilled in the art from the following detailed description.

Figure 2:
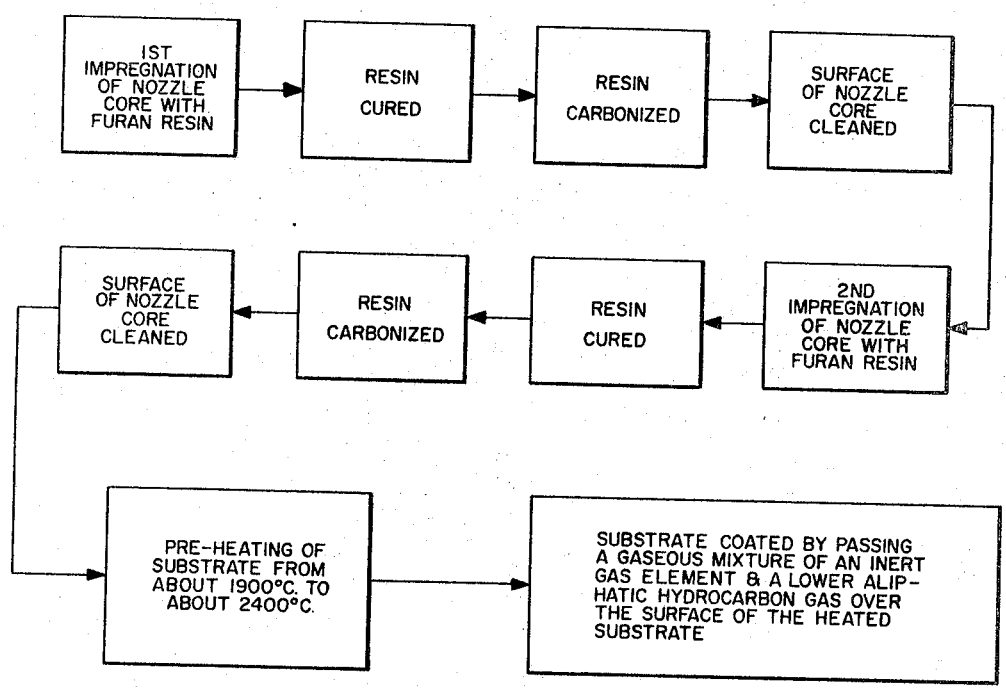

FIGURE 1 in the accompanying drawing is a flow sheet showing applicant's coating process. FIGURE 2 illustrates this process with added pretreatment steps.

For clarification, three terms are defined hereinafter to prevent misunderstanding of the invention as a result of the inaccurate definitions sometimes attributed to the term "graphite."

Graphite: An allotropic crystalline form of carbon, referring specifically to an ideal crystal structure; that is a stacked, hexagonal layer plane with 1.42 A. between carbon atoms forming regular hexagons in the layers and with a stacking distance of 3.354 A. between adjacent layer planes. Further, a complete three-dimensional order exists with a a-b-a arrangement of layer planes, that is, the carbon atoms in alternate layer planes lie one above the other, while in intermediate layer planes a carbon atom lies over the center of the hexagon below it. The bonding in the layer planes is by valence bonds, while the cross layer bonding is much weaker being chiefly of the Van der Waals type.

Commercial graphite: A compact consisting of ground coke with a carbonized pitch binder. This term is perhaps the most difficult to define because it is applied to the greatest variety of materials. The degree of graphitization or, in other words, the amount of carbon which has been converted to a highly structured form approaching the true graphite crystal, is established only through the complete history of all ingredients in the material. Other things being equal, the higher the baking temperature the further advanced is the graphitization. The anisotropy of a commercial graphite is determined both by the graphitizing thermal treatment it has received and by the mechanical compaction it has undergone. Molded commercial graphite has some preferred orientation of the layer planes perpendicular to the pressing direction; extruded commercial graphite has some preferred orientation of the layer planes parallel to the extrusion axis. Since the exact nature of a commercial graphite is determined by such a variety of factors, for example, the source and nature of the granular coke, the source and nature of the binder pitch, the method and pressure of compaction, and the thermal treatment of the compact, the term is rather broad.

Pyrolytic graphite: A form of carbon prepared by vapor deposition on a hot substrate and having a high degree of crystalline orientation. Since this material is built up on a hot surface, essentially atom by atom from a carbonaceous source gas, the orientation of the graphite layer planes is parallel to the substrate surface. In general, no orderly relation exists among the parallel stack of layer planes to yield a third-dimensional order. This so called "turbostratic" structure, which is accomplished by a layer-stacking distance of about 3.44 A., produces a marked degree of anisotropy in thermal and mechanical properties. Other characteristics of pyrolytic graphite include high purity and high density, approaching true density (zero porosity). The anisotropy, density, and purity vary according to the deposition conditions. By analogy, pyrolytic graphite corresponds to a crystalline body solidified from a melt, while commercial graphite corresponds to a pressed and sintered, or briquetted body.

The substrates utilized herein are generally all of the commercial graphite type, since the combination of a commercial graphite substrate and a pyrolytic graphite coating resulted in rocket nozzles which gave excellent results when employed in solid propellant rocket engines. However, it is to be understood that the present process is readily adaptable to depositing pyrolytic graphite on other substrates such as true graphite and the like.

The present process provides for regulating the actual physical condition of the surface of the substrate, the flow rate of the hydrocarbon gas-inert gas mixture over the substrate, the concentration of the hydrocarbon gas in this gaseous mixture, gas dynamics over the substrate, and the temperature of the substrate during the deposition of the pyrolytic graphite layer. Without the controls set forth in the present process, pyrolytic graphite coatings on graphite substrates fail at high temperatures and are useless for rocket nozzle application, especially at high temperatures.

According to the present process, a mixture of an inert gas and a hydrocarbon gas is passed over the graphite substrate maintained at a temperature within the range of 1900° C. to 2400° C. Since the inert gas serves only as a diluent any inert gas element will be satisfactory, for example, neon, helium, and the like. The hydrocarbon gas can be any of the lower aliphatic hydrocarbon gases such as methane, ethane, propane, butane, isobutane, ethylene, acetylene, and mixtures of these although it is preferable to use only a single hydrocarbon gas for better control of the process. The hydrocarbon gas comprises from about 1% by volume to about 6% by volume of the total volume of the gaseous mixture. As the concentrations of the hydrocarbon gas is one of the factors affecting the rate of deposition of pyrolytic graphite, the actual concentration is adjusted to give a deposition rate such that the coating accumulates uniformly at about 2 mils/hr. to about 15 mils/hr. and preferably at about 5 mils/hr.

The temperature of the substrate is critical. While pyrolytic graphite will deposit on a surface heated to a temperature of about 1300° C., it requires substrate temperatures in the range of 1900° C. to 2400° C. to effect pyrolytic graphite coatings suitable for use in rocket nozzles. Below these temperatures, the growth of the pyrolytic graphite is by means of large, erratic cone structures. This type of structure contributes greatly to the delamination and spalling failures mentioned hereinabove. Substrate temperatures of about 2000° C. are preferred.

The flow of the gaseous mixture over the substrate surface also affects the deposition of the graphite coating. The composition of the gaseous mixture should be uniform, that is, the hydrocarbon gas should be uniformly dispersed in the inert diluent. Generally, the flow rate over the surface should also be uniform in order that the pyrolytic graphite layer builds up evenly on the substrate. If, for example, the gas flow is directed against any portion of the substrate, the pyrolytic graphite coating in that area accumulates at a faster rate than in the other areas away from the directed gas stream. This feature can be helpful, however, if it is desirable to provide coatings of varying thickness. Increasing the flow rate increases the amount of hydrocarbon gas which contacts the heated substrate, other things being equal. This has substantially the same effect as increasing the hydrocarbon gas concentration in the gaseous mixture.

The surface finish of the substrate in the range from 80 grit to 400 grit does not appear to affect the quality of the pyrolytic coating except that the finish on the surface of the pyrolytic coating reflects the finish of the substrate, that is, a rough substrate surface produces a rough surface on pyrolytic graphite coating. However, to obtain a uniform pyrolytic graphite microstructure of the desired reduced cone size requires a relatively smooth surface that is as chemically inactive as possible. In fact, substrate surfaces which are honed smooth give very good pyrolytic graphite coatings although some roughness of the surface of the substrate can contribute to stronger bonding between the substrate and the pyrolytic graphite.

One means of eliminating large, wide-angle cones from the coating is by impregnating the substrate surface with a furan resin. The resin is applied to the substrate, cured in the conventional manner, and thereafter heated to a temperature of about 700° C. to about 800° C. to carbonize the resin. After the heat treatment, any loose material is removed from the surface of the impregnated substrate. The furan impregnating operation can be applied to the substrate two or more times if each application of the resin is cured and then heated to a temperature of about 700° C. or 800° C. to carbonize the resin. To achieve a smooth coating of pyrolytic graphite, the impregnated substrate should be relatively smooth. In some instances, the impregnated substrate was honed smooth before depositing the pyrolytic graphite with excellent results. Again, however, some roughness contributes to better bonding of the pyrolytic graphite coating. The pyrolytic graphite deposited on the furan resin impregnated substrate exhibited a great reduction in large cones in the microstructure. Any of the commercially available furan resins used for impregnating wood, plaster of Paris, and chemical stoneware are acceptable for impregnating the graphite substrate. This particular method of pretreating the substrate allows the use of lower deposition temperatures in forming satisfactory pyrolytic graphite coatings, for example, on the order of about 1500° C. to 2000° C. This is a distinct advantage in reducing costs of the process.

The nozzles discussed hereinafter were made by depositing the pyrolytic graphite coating on a nozzle blank made from commercial graphite. In some instances, the process was closely regulated so that when the coating reached a predetermined size, the process was stopped. In other cases, an excess of the pyrolytic graphite was allowed to accumulate and the excess was subsequently removed by routine machining operations. Moreover, in some cases where the nozzle was of the segmented type, only the region of the nozzle in the region of the throat was coated. In all cases the nozzles performed very satisfactorily over a wide range of pressure and temperature conditions.

Commercial graphite substrates suitable for forming nozzle cores or nozzle blanks, as they are sometimes called, include but are not limited to the standard grade of graphite used in commercial graphite pipe and high-purity graphite such as grade AGOT (produced by National Carbon Company). Nozzle cores are formed from these materials according to standard techniques well known in the art such as molding and/or machining operations.

In manufacturing the rocket nozzles discussed herein, a resistance heated tube furnace (Pereny Equipment Company, Model C412) with a tube inside diameter of four inches was employed although the particular means for heating the substrate is not critical. The furnace, which has a heated length of four feet, can maintain controlled temperatures from 1300° C. to 3000° C. using a magnetic amplifier-saturable reactor control system. The sensing element is a radiometer which is focused on the outer surface of the substrate tube through a sight tube at the center of the furnace. The temperature within a region of about twelve inches in the center of the tube is essentially uniform. Therefore, graphite substrates to be coated with pyrolytic graphite are placed in this center region of the furnace.

The inert argon gas and the aliphatic hydrocarbon gases are taken from commercial compressed gas cylinders and their flow is regulated with standard rotameters. All the pyrolytic depositions are made at atmospheric pressure with the unused gases discharging into a ventilation hood. The mixture of aliphatic hydrocarbon gas and argon is brought to the graphite substrate to be coated through an injector consisting of three concentric tubes. The gas mixture passes through the inner tube while cooling water enters through the middle tube and exits through the outer tube. The cooling water prevents the pyrolytic graphite depositing process from starting until the gas mixture is in the region of the substrate to be coated. A replaceable uncooled graphite nozzle can be attached to the injector. Moreover, an expansion tip on the injector can help to achieve uniformity in the gas mixture. It is also possible to permit part of the inert gas to enter the furnace tube through a part located outside the injector. This latter procedure is sometimes useful in achieving uniform coatings on the substrate. These as well as many other obvious expedients will be apparent to those skilled in the art.

Table I gives the operating conditions used to deposit a coating of pyrolytic graphite on ten 12-inch lengths of commercial graphite pipe and the results achieved. The graphite pipe was centered in the tube furnace and when the pipe had reached the indicated temperature, the gas flow was initiated. All the aliphatic hydrocarbon gas entered the tube furnace through the water-cooled injector. However, the per cent by volume hydrocarbon gas is based on the total volume of gas involved including that inert gas introduced into the furnace other than through the injector.

TABLE I.—DEPOSITION CONDITIONS

| Run No. | Aliphatic Gas Concentration, Percent by Volume | Percent of Gas Through Injector [1] | Deposition Temperature, °C. | Time, Hours | Maximum Deposition Rate, mils/hr.[2] | Coating Thickness, Mils | Density, g./cc. | Crystallite Dimensions, A. | | 004 Peak Intensity, Relative Units |
|---|---|---|---|---|---|---|---|---|---|---|
| | | | | | | | | $L_a$ | $L_c$ | |
| 1 | 6% $CH_4$ | 60 | 2,000 | 2 | 12 | 24 | 2.22 | 92 | 68 | 17.2 |
| 2 | 6% $CH_4$ | 60 | 2,200 | 2 | 15 | 18 | 2.19 | 165 | 78 | 13.2 |
| 3 | 6% $CH_4$ | 60 | 2,100 | 2 | 16 | 10 | 2.18 | 141 | 78 | 10.0 |
| 4 | 2.5% $CH_4$ | 60 | 2,000 | 3 | 5 | 11 | 2.15 | 142 | 92 | 7.5 |
| 5 | 5% $CH_4$ | 80 | 2,000 | 4 | 5 | 20 | 2.17 | 179 | 92 | 5.5 |
| 6 | 2.5% $CH_4$ | 90 | 1,900 | 3 | 5 | 10 | 2.19 | 124 | 78 | 6.4 |
| 7 | 2.5% $C_3H_8$ | 90 | 2,000 | 2 | 8 | 17 | 2.19 | 124 | 73 | 9.0 |
| 8 | 1.2% $C_3H_8$ | 90 | 2,200 | 4 | 9 | 28 | 2.17 | 105 | 92 | 8.6 |
| 9 | 5% $CH_4$ | 90 | 2,400 | 3 | 6 | 10 | 2.16 | 141 | 85 | 8.8 |
| 10 | 2.5% $CH_4$ | 90 | 2,400 | 4 | 4 | 12 | 2.18 | 117 | 78 | |

[1] Total gas flow rate was 20 cubic feet (STP) per hour in all runs except Run 5 in which 10 cubic feet (STP) of gas per hour was used. Gas entering outside injector was argon.
[2] Deposition rate calculated from mean thickness at cross section where maximum thickness occurred.

The results of the runs were obtained by studying two-inch segments of the pyrolytic graphite coated pipe cut from the original twelve-inch lengths at the completion of the process.

Standard X-ray laboratory techniques and instruments were used in the X-ray analysis of the coatings. The crystallite dimensions $L_c$ (average crystallite dimension in the stacking direction) and $L_a$ (average crystallite diameter on the basal planes) were determined from the line broadening of selected reflections at half maximum intensity. The peaks selected to determine the parameters $L_c$ and $L_a$ were the crystalline reflections of the 004 planes and the 10 bands, respectively. The 004 reflection is a typical symmetrical diffraction peak resulting from uniform stacking of the layer planes. However, the 10 reflection rises sharply to a peak and then subsides slowly on the high angle side, this being caused by two dimensional order in the graphite layer planes which produces a grating effect. If the turbostratic structure were to form a true graphite three-dimensional order, sharp peaks would be resolved from the 10 band. Conversely, the substantial absence of this resolution in the 10 band indicates a turbostratic structure.

The X-ray diffraction analysis demonstrated that, without exception, the pyrolytic graphite structures produced in runs 1 through 10 had an inter-layer spacing ($d$-spacing) very close to 3.45 A. This value is typical of that found in turbostratic structures in graphite.

Density of the deposit material was determined by a sink-float technique using a mixture of bromoform and ethyl alcohol. A sample of the material was placed in a beaker containing the liquid mixture and the composition of the mixture then adjusted so that the sample would neither sink nor float. At this point the density of the sample was equal to that of the liquid and all that was required to determine the density was to weigh a known volume of the liquid. All the densities measured lie very close to, or correspond to, the theoretical density (2.19 g./cm.) of turbostratic graphite with a layer spacing of 3.45 A. This means that the porosity of the coatings is very near zero and this is undoubtedly one of the reasons pyrolytic graphite coatings produced by the present method are very inert, even at high temperatures.

Microstructural examinations were conducted on polished sections of the deposited material using a metallurgical microscope and conventional techniques of microscopy. It was found to be advantageous to use polarized light in studying the cone structures, a typical type of microstructure for most vapor-deposited materials. These "growth" cones are characteristic of pyrolytic graphite and no other single feature of this material is more important in determining the usefulness of a pyrolytic graphite deposit. The cones are too large to be single crystallites. However, the conical microstructure does represent the interaction of the growth of pyrolytic graphite from various domains on the substrate or within the coating itself.

Pyrolytic graphite deposited according to some processes has a large, wide-angle cone type of microstructure. When these large primary cones are present in the microstructure, delamination cracks through individual grains are apparent. These cracks often join to form more severe delamination cracks. Obviously, pyrolytic graphite coatings having this type of microstructure are not suitable for use under severe conditions such as in rocket nozzles. The present process produces a microstructure of fine cones which are often regenerative throughout the layer. This type of microstructure is free from the inherent weaknesses of the delamination cracks.

Two segments of graphite pipe were impregnated with a furan resin before carrying out the pyrolytic deposition process. One pipe segment received a single pretreatment with the resin while the other received two treatments. The liquid furan resin was applied to the surface of each pipe and allowed to cure. The coated pipe was then heated to 760° C., allowed to cool, and thereafter honed to a surface finish of 80 grit. In the second case, after honing, an additional coating of furan resin was applied following the same procedure. The pipes were placed in the furnace, heated to 2000° C., and a argon-methane gas consisting of 5% by volume methane passed over the pipes. Argon in the amount of 10% of the total gas flow of 20 cubic feet per hour (STP) was introduced into the furnace outside of the main gas injector. The pyrolytic coatings were free of large cones in the microstructure and exhibited the desired microstructure of regenerative, fine cones. Better bonding between the substrate surface and the pyrolytic graphite would be achieved by leaving the substrate surface moderately rough. Reducing the temperature of the substrate to 1500° C. also permitted the deposition of satisfactory pyrolytic coatings when the substrate had at least one impregnation treatment with the furan resin.

Acetylene and other unsaturated lower aliphatic hydrocarbon gases are completely acceptable in the present process. Satisfactory pyrolytic graphite coatings were deposited on commercial graphite pipes at 2000° C. using an acetylene argon gas mixture containing 5% by volume acetylene and a deposition rate of 4.5 mils/hour. In another case, a gas mixture containing 2.5% by volume acetylene (the remainder being argon) and a deposition rate of 9.5 mils/hour produced a satisfactory coating. A flow rate of 20 cubic feet/hour (STP) was employed in both cases. Similar coatings using ethylene as the hydrocarbon gas were also satisfactory.

Actual serviceability tests were run on rocket nozzles coated with pyrolytic graphite according to the present process. The nozzle blanks were made from commercial graphite and the pyrolytic graphite coatings were produced according to the same process as the coatings on the graphite pipes discussed hereinabove. For most of the nozzles, the substrate was heated in the resistance furnace to 2000° C., an argon-methane gas mixture containing 5% by volume methane was passed over the nozzle blank, and the flow of gas into the chamber was regulated to 20 cubic feet/hour (STP). In most instances, the rate of deposition of the pyrolytic graphite coating was about 5 mils/hour and an overall thickness of about 25 mils was achieved. However, for evaluation purposes, coatings of up to 50 mils in thickness were tested. The results of the actual firings are summarized in Table II below.

TABLE II.—MOTOR TEST DATA FOR PYROLYTIC GRAPHITE COATED NOZZLES [1]

| Firing No. | Pyrolytic Graphite Deposition Temperature, °C. | Motor Operating Conditions | | Nozzle Erosion Rate, mils/sec. |
|---|---|---|---|---|
| | | Average Pressure, p.s.i. | Duration, sec. | |
| 1 | 2,000 | 367 | 45 | 0.12 |
| 2 | 2,000 | 686 | 24 | 0.11 |
| 3 | 2,000 | 748 | 52 | 0.27 |
| 4 | 2,000 | 825 | 31 | 0.34 |
| 5 | 2,000 | 710 | 47 | 0.11 |
| 6 | 2,000 | 766 | 45 | 0.07 |
| 7 | 2,000 | 795 | 32 | 0.00 |
| 8 | 2,000 | 840 | 61 | 0.27 |
| 9 | 2,000 | 948 | 59 | 0.21 |
| 10 | 2,000 | 1,167 | 30 | 0.54 |

[1] Firing number 1-4 used a solid propellant having a flame temperature of 6,500° F. and an oxidation ratio of 1.08; number 6-10 used a solid propellant having a flame temperature of 6,000° F. and an oxidation ratio of 1.20.

An erosion rate of 0.5 mil/sec. is considered excellent, a level which few rocket nozzle materials can achieve under severe operating conditions. It is apparent from Table II, therefore, that the pyrolytic graphite coated nozzles performed extremely well. The erosion rate correlation with motor pressure for firings 6 through 10 is defined by the following equation:

$$\text{Erosion rate, mil/sec.} = 9 \times 10^{-4}(Pc - 620)$$

The motor pressure, $Pc$, is expressed as p.s.i. A material which shows negligible erosion in firings with this propellant up to 600 p.s.i. is an outstanding uncooled rocket nozzle material. No monolithic commercial graphite, even those of very high density, can approach this level of performance.

The necessary coating thickness will be determined by the type of propellant used and the burning duration of the motor. The coating thickness should provide for some margin of safety. However, unnecessarily thick coatings merely increase the chance of coating failure. Moreover, thicker coatings appear to have a slightly higher erosion rate than do thinner coatings.

The above detailed description sets forth a process whereby pyrolytic graphite coatings can be deposited on a graphite substrate in such a manner that the coated object can resist high heat flux and erosive forces successfully. No undue limitation should be attributed to this process as a result of this description except as reflected in the appended claims.

I claim:

1. The process for forming a high-temperature resistant and erosion resistant coating of pyrolytic graphite on a graphite substrate comprising the steps of:

(a) heating said substrate to a temperature within the range of about 1900° C. to about 2400° C.; and (b) continuously passing a gaseous mixture of an inert gas element and a lower aliphatic hydrocarbon gas over the surface of the heated substrate at a total gas flow rate of about 10 cubic feet (STP) to about 20 cubic feet (STP) per hour, said hydrocarbon gas comprising from about 1% by volume to about 6% by volume of the total volume of said gaseous mixture and said inert gas comprising substantially the remainder of the total volume of said gaseous mixture.

2. The process according to claim 1 wherein said hydrocarbon gas is a member selected from the group consisting of methane, ethane, propane, butane, ethylene, and acetylene.

3. The process according to claim 1 wherein said hydrocarbon gas is methane.

4. The process according to claim 3 wherein said inert gas element is argon.

5. The process according to claim 4 wherein methane comprises about 5% by volume of said gaseous mixture.

6. The process according to claim 5 wherein said substrate is heated to a temperature of about 2000° C.

7. The process according to claim 1 wherein the flow of said gaseous mixture is selectively directed against said substrate so as to provide a coating of variable thickness on said substrate.

8. The process for forming a high-temperature resistant and erosion resistant coating of pyrolytic graphite on a graphite substrate comprising the steps of:
   (a) impregnating said substrate with a furan resin and allowing said resin to cure;
   (b) heating the furan impregnated substrate to a temperature in the range of about 700° C. to about 800° C. and thereafter removing any loose materials from the surface of said impregnated substrate;
   (c) again heating said impregnated substrate to a temperature within the range of about 1500° C. to about 2000° C.; and
   (d) continuously passing a gaseous mixture of an inert gas element and a lower aliphatic hydrocarbon gas over the surface of the heated, impregnated substrate at a total gas flow rate of about 10 cubic feet (STP) to about 20 cubic feet (STP) per hour, said hydrocarbon gas comprising from about 1% by volume to about 6% by volume of the total volume of said gaseous mixture and said inert gas comprising substantially the remainder of the total volume of said gaseous mixture.

9. The process according to claim 8 wherein the surface of said furan impregnated substrate is smoothed before heating to the range of about 1500° C. to about 2000° C.

10. The process according to claim 8 wherein said inert gas is argon.

11. The process according to claim 8 wherein said hydrocarbon gas is a member selected from the group consisting of methane, ethane, propane, butane, ethylene, and acetylene.

12. The process according to claim 8 wherein the flow of said gaseous mixture is selectively directed against said substrate so as to provide a coating of variable thickness on said substrate.

13. A process for forming a high-temperature-resistant and erosion-resistant rocket nozzle formed of a pyrolytic graphite coating on a graphite substrate, said process comprising the steps of:
   (a) providing a graphite nozzle core having a bore diameter larger than the desired final diameter of the rocket nozzle bore.
   (b) heating said nozzle core to a temperature within the range of about 1900° C. to about 2400° C., and
   (c) continuously passing a gaseous mixture of an inert gas element and a lower aliphatic hydrocarbon gas over the surface of the heated nozzle core at a total gas flow rate of about 10 cubic feet (STP) to about 20 cubic feet (STP) per hour to form a coating of pyrolytic graphite on the surface of said core, said coating having a sufficient depth to reduce the bore diameter to a dimension at least equal to the desired final dimension of said rocket nozzle bore, said hydrocarbon gas comprising from about 1% by volume to about 6% by volume of the total volume of said gaseous mixture and said inert gas comprising substantially the remainder of the total volume of said gaseous mixture.

14. The process according to claim 13 wherein the depth of said pyrolytic graphite coating is sufficient to reduce said bore diameter to a dimension less than the desired final dimension of said rocket nozzle and including the step of subsequently removing the excess portion of said pyrolytic graphite coating to form a bore diameter equal to the desired final dimension of said rocket nozzle bore.

15. The process according to claim 14 wherein said hydrocarbon gas is at least one of the members selected from the group consisting of methane, ethane, propane, butane, ethylene, and acetylene.

16. The process according to claim 15 wherein said gaseous mixture consists essentially of 5% by volume methane, the remainder of the mixture being argon and said nozzle core is heated to a temperature of about 2000° C.

17. The process according to claim 13 wherein the flow of said gaseous mixture is selectively directed against said nozzle core so as to provide a coating of variable thickness on said nozzle core.

References Cited by the Examiner

UNITED STATES PATENTS

| | | | |
|---|---|---|---|
| 2,062,370 | 12/1936 | Miller | 117—47 |
| 2,282,235 | 5/1942 | Moberly | 117—46 |
| 2,789,038 | 4/1957 | Bennett et al. | 117—46 |
| 2,922,722 | 1/1960 | Hutcheon | 117—46 |
| 2,972,552 | 2/1961 | Winter. | |
| 3,084,394 | 4/1963 | Bickerdike et al. | 117—46 |
| 3,102,047 | 8/1963 | Rivington | 117—46 |
| 3,107,180 | 10/1963 | Diefendorf | 117—46 |
| 3,120,450 | 2/1964 | Diefendorf et al. | 117—46 |
| 3,167,449 | 1/1965 | Spacil | 117—200 |

FOREIGN PATENTS 928,532   6/1963   Great Britain.

WILLIAM D. MARTIN, *Primary Examiner.*

MURRAY KATZ, *Examiner.*

H. E. COLE, W. D. HERRICK, *Assistant Examiners.*